(12) United States Patent
Bhambra

(10) Patent No.: US 6,913,323 B2
(45) Date of Patent: Jul. 5, 2005

(54) WHEEL HAVING SPOKES WITH V-SHAPED CROSS-SECTIONS

(75) Inventor: Ranjit Bhambra, Tiefenbronn-Mühlhausen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 278 days.

(21) Appl. No.: 09/820,316

(22) Filed: Mar. 29, 2001

(65) Prior Publication Data

US 2001/0026094 A1 Oct. 4, 2001

(30) Foreign Application Priority Data

Mar. 31, 2000 (DE) .......................................... 100 17 028

(51) Int. Cl.[7] .............................. B60B 1/06; B60B 5/00; B60O 3/10
(52) U.S. Cl. ...................... 301/66; 301/104; 301/64.101
(58) Field of Search ........................ 301/65–67, 73–74, 301/80, 64.704, 64.705, 64.101, 64.102, 104, 105.1, 704; D12/201, 211, 210, 204, 209

(56) References Cited

U.S. PATENT DOCUMENTS

| | | | | |
|---|---|---|---|---|
| 521,587 | A | * | 6/1894 | Hirt .............................. 301/65 |
| 1,201,926 | A | * | 10/1916 | Blackwood ................... 301/65 |
| 1,414,662 | A | * | 5/1922 | Morgan ........................ 301/65 |
| 1,502,759 | A | * | 7/1924 | Wade ........................... 301/65 |
| 1,506,098 | A | * | 8/1924 | Wade ........................... 301/65 |
| 1,893,334 | A | * | 1/1933 | Miller ..................... 301/108.1 |
| 1,899,289 | A | * | 2/1933 | Miller ..................... 301/108.1 |
| 1,964,129 | A | * | 6/1934 | Miller .......................... 301/65 |
| 1,966,824 | A | * | 7/1934 | Miller ..................... 301/105.1 |
| 1,966,825 | A | * | 7/1934 | Miller ..................... 301/105.1 |
| D205,032 | S | * | 6/1966 | Reid .......................... D12/211 |
| 3,428,365 | A | * | 2/1969 | French ................... 301/35.631 |
| 3,659,901 | A | | 5/1972 | Porsche et al. |
| 4,444,435 | A | * | 4/1984 | Honsa .................... 301/64.701 |
| 5,538,329 | A | * | 7/1996 | Stach .......................... 301/65 |
| 5,548,896 | A | | 8/1996 | Archibald et al. |
| 5,613,739 | A | | 3/1997 | Sands |
| D441,708 | S | * | 5/2001 | Pfeiffer ...................... D12/211 |
| 6,231,129 | B1 | * | 5/2001 | Stach .......................... 301/65 |
| D450,027 | S | * | 11/2001 | Kuribayashi ............... D12/209 |
| D450,286 | S | * | 11/2001 | Kuribayashi ............... D12/209 |
| D450,646 | S | * | 11/2001 | Kuribayashi ............... D12/209 |
| D451,063 | S | * | 11/2001 | Yoshida ..................... D12/209 |
| 6,325,462 | B1 | * | 12/2001 | Hummel et al. .............. 301/65 |
| D453,131 | S | * | 1/2002 | Gabath ...................... D12/209 |

FOREIGN PATENT DOCUMENTS

| | | |
|---|---|---|
| DE | 1 802 298 | 5/1970 |
| DE | 1802298 | 5/1970 |
| DE | 9301314.0 | 6/1993 |
| DE | 9117160 U1 | 9/1996 |
| DE | 91 17 160 U1 | 9/1996 |

* cited by examiner

Primary Examiner—Russell D. Stormer
Assistant Examiner—Jason R. Bellinger
(74) Attorney, Agent, or Firm—Crowell & Moring LLP

(57) ABSTRACT

A wheel for a motor vehicle has a wheel hub connected with a wheel rim by spokes. In order to create a wheel for a motor vehicle which has low weight and high stability, spokes arranged between the wheel hub and the rim are constructed such that, in first areas connected with the wheel hub, the spokes have solid cross-sections and, in second areas connected with the rim, the spokes have V-shaped cross-sections. Transitions between the two areas are progressive; that is, along a longitudinal course of each spoke from the wheel hub toward the rim, the cross-section of a spoke is changed from an initially solid cross-section, which preferably has an elliptical construction, to a triangular cross-section, which then further changes to a V-shaped cross-section while forming a groove arranged in its center.

15 Claims, 10 Drawing Sheets

WHEEL HAVING SPOKES WITH V-SHAPED CROSS-SECTIONS

This application claims the priority of German application 100 17 028.5, filed Mar. 31, 2000, the disclosure of which is expressly incorporated by reference herein.

BACKGROUND AND SUMMARY OF THE INVENTION

The present invention relates to a wheel for motor vehicles including a wheel hub, a rim, and spokes by which the wheel hub and the rim are connected with one another.

A wheel for motor vehicles, in which a wheel hub is connected with a rim by spokes which have Y-shaped cross-sections, is known from German Patent Document DE 18 02 298 A1. Standing flanges of the spokes are arranged on the forward side of the wheel end on a disk-shaped surface of the wheel hub. Fork-shaped sections of the webs provided on the rearward side of the wheel are connected to a ring body of the wheel hub. The openings formed between the spokes are partially closed by a disk element in the areas adjoining the wheel hub. The wheel hub is provided with indentations which are open toward the rearward side of the wheel and which are arranged between fastening openings for wheel bolts. On both its inner circumference and its outer circumference, the wheel hub is bounded by a continuous, approximately cylindrically shaped area.

It is an object of this invention to provide a wheel for motor vehicles which has both low weight and high stability.

According to the invention, this object is achieved by providing the spokes of a wheel, in first areas connected with the wheel hub, with solid cross-sections and, in second areas connected with the rim, with V-shaped cross-sections. The spokes are arranged such that the transitions between the first and second areas are progressive; that is, along the longitudinal course of a spoke from the wheel hub toward the rim, the cross-section changes from an initially solid cross-section, which preferably has an elliptical construction, to a triangular solid cross-section, which then changes further to a V-shaped cross-section while forming a central groove. As a result of this construction, a solidly constructed area is provided at the location of the highest loading of the spoke, specifically at the transition to the wheel hub. The solidly constructed area has high stability. The V-shaped spoke cross-sectional configuration arranged in the area of the rim takes advantage of reduced loading by saving material. Simultaneously, the V-shaped construction provides a high rigidity in the transverse direction of the wheel. High rigidity in this transverse direction is important, particularly during cornering, because, in this condition, lateral forces are introduced to the wheel along a smaller circumferential area.

Advantageous further developments of the invention are reflected in certain claims.

The spokes can be arranged so that they correspond with openings for receiving fastening bolts in the wheel hub. In this case, the fastening bolts and, therefore, the wheel hub accommodate one-sided introduction of force as lengthening of the spokes, so that a centric introduction of force into the spokes takes place. Together with the first areas of the spokes adjoining the wheel hub, third areas are formed which comprise the fastening bolts and which result in good distribution and introduction of force into the spokes.

The wheel hub is preferably constructed to have indentations between the openings for the fastening bolts. The indentations are open toward the interior side of the wheel. One continuous, approximately cylindrically constructed body, respectively, is provided on each of the inner and outer circumferences of the wheel hub. On its exterior side, the wheel hub is closed off by a surface which is perforated by the openings for the fastening bolts. To the extent that it is necessary, a continuous opening for receiving an axle journal can naturally be provided in the center of the wheel hub. A shell-shaped wheel hub which is highly stable and which has a low weight is therefore formed.

In the second areas, the spokes may be constructed with V-shaped cross-sections such that, on each of the legs forming a "V", free faces are provided with thickenings extending in the longitudinal directions of the spokes. As a result of these thickenings, the susceptibility of the faces, and also of the legs, to damage is reduced. Simultaneously, the thickenings contribute to a further increase in the stability of the spokes in the second areas.

Finally, the legs forming the V-shaped cross-sections may be constructed in the second areas such that, in each spoke, their widths increase continuously over the course of the spoke toward a linkage to the rim. Simultaneously, spreading of the legs can be increased along the course of the spoke in the direction of the rim, or the legs can be provided with curvatures defining spreading. This configuration in the area by which the spoke is linked to the rim improves the introduction of peripheral forces from the spoke into the rim. In this context, the wall thickness of the legs can be decreased as the width of the legs increases. If a thickening is provided on faces of the legs, the thickening should decrease to a smaller degree than the wall thickness of the legs.

BRIEF DESCRIPTION OF THE DRAWINGS

The invention will now be explained in detail by way of reference to an embodiment illustrated in the drawing figures.

DESCRIPTION OF THE PREFERRED EMBODIMENT

Figure 1:
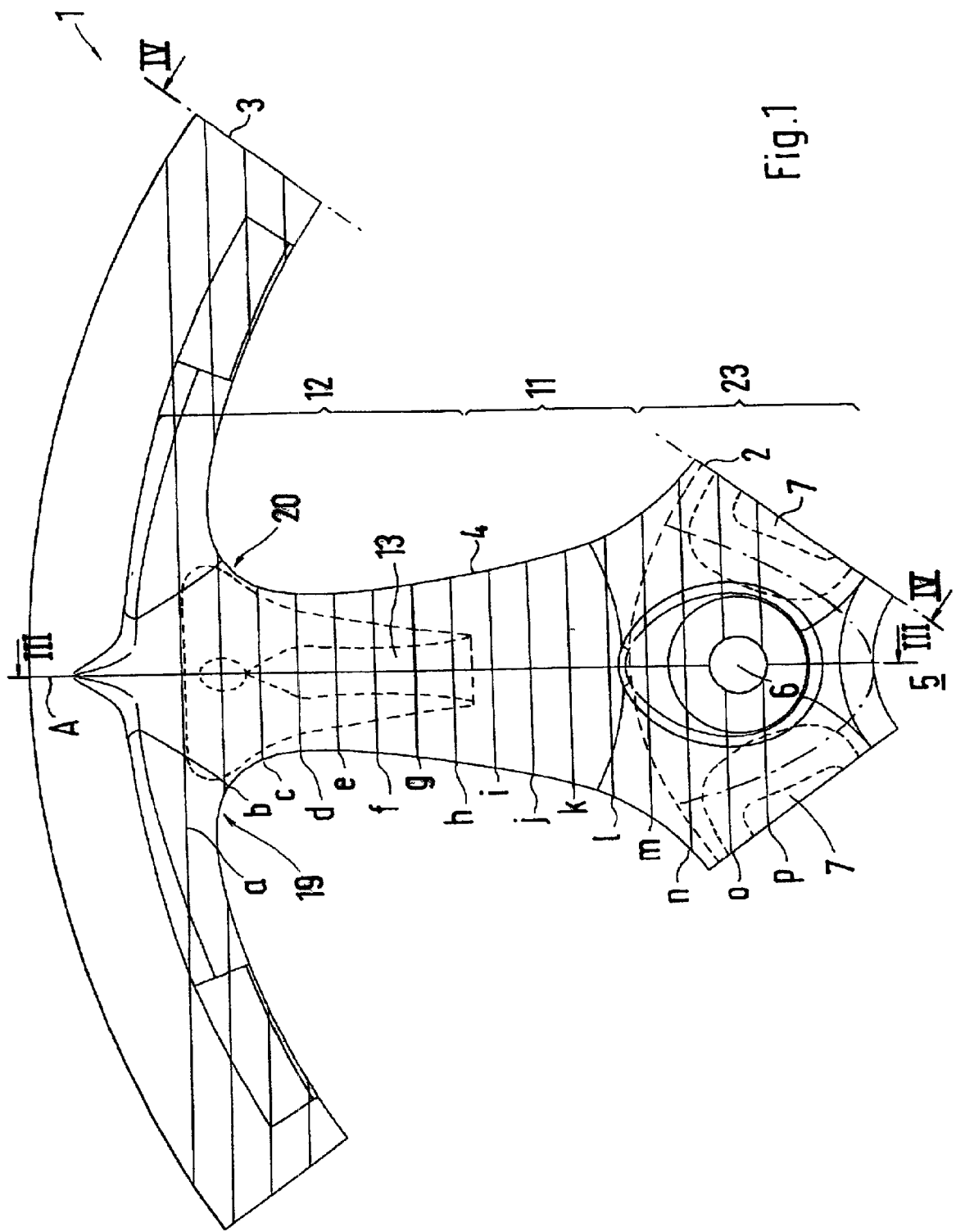
FIG. 1 is a partial front view of a wheel according to the invention.

FIG. 1 is a partial view of a wheel 1 having a wheel hub 2, a rim 3, and spokes 4 which connect the wheel hub 2 with the rim 3. The wheel hub 2 has a central opening 5 for receiving an axle journal, which is not shown, as well as openings 6 for fastening bolts which are not shown. The spokes 4 start on the wheel hub 2 in the area of the openings 6 and end at the edge of the rim 3. Each spoke 4 is situated together with one of the openings 6 on a radially extending axis A.

Figure 2:
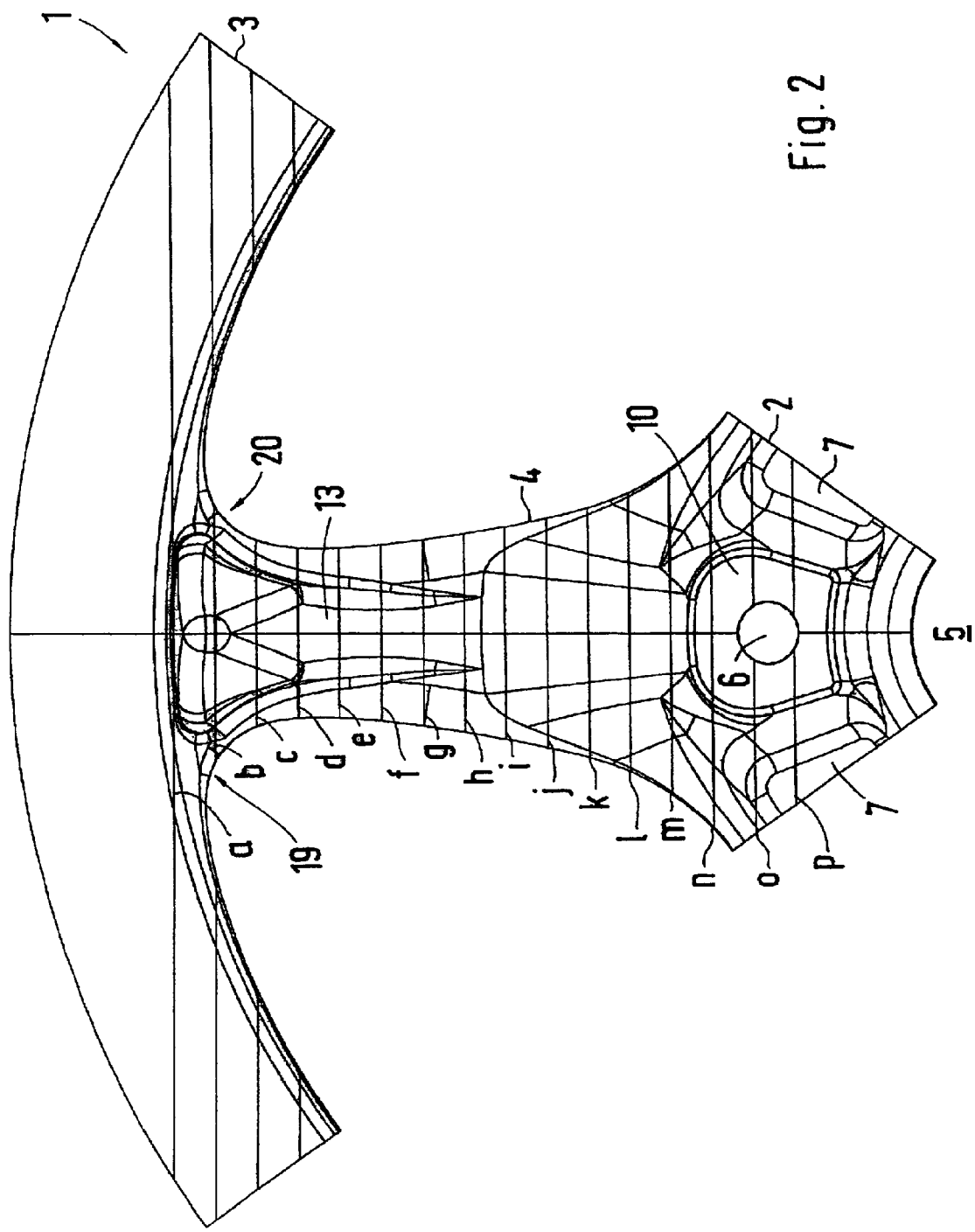
FIG. 2 is a partial rear view of the wheel shown in FIG. 1.
Figure 3:
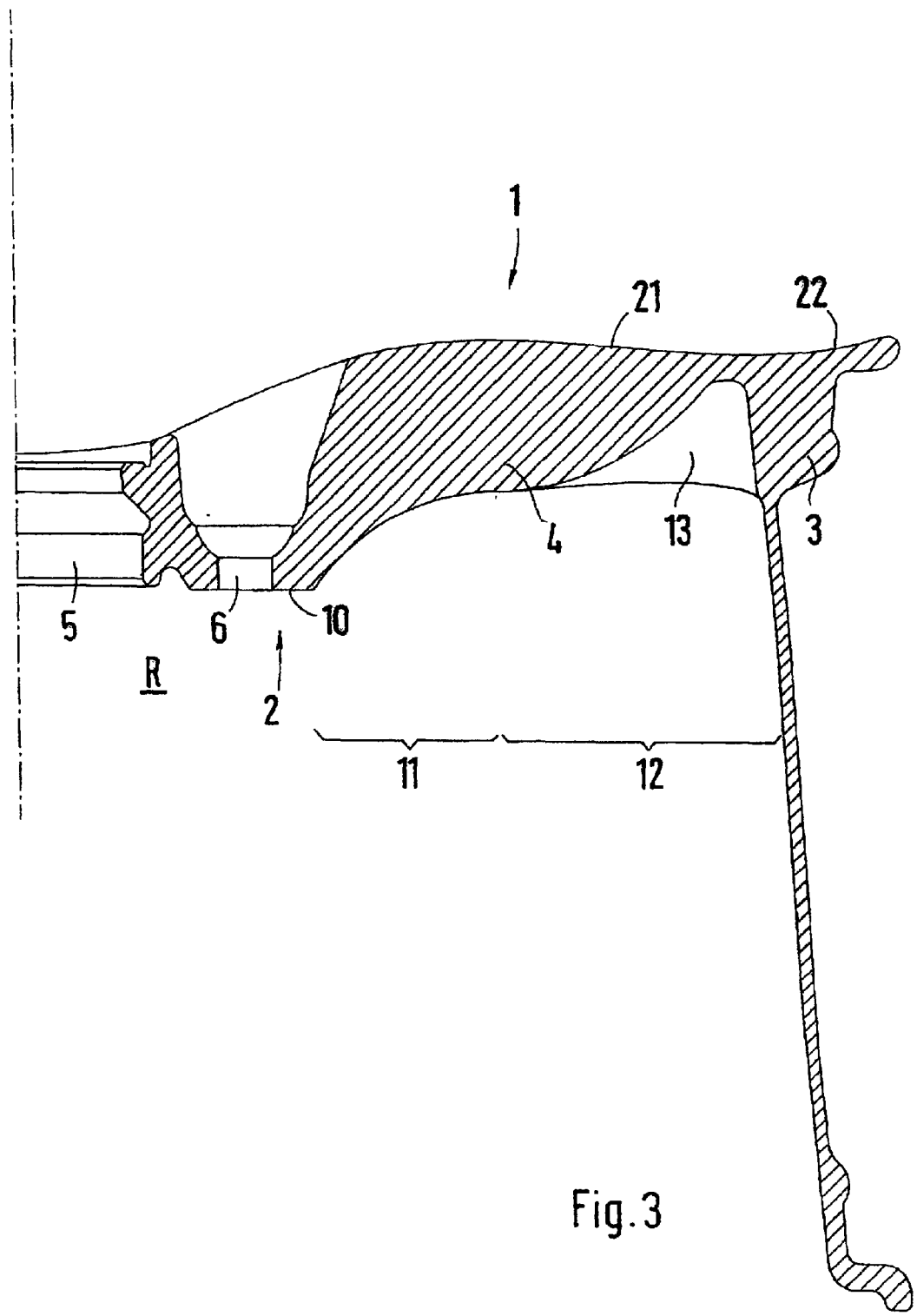
FIG. 3 is a sectional view along line III—III of FIG. 1.
Figure 4:
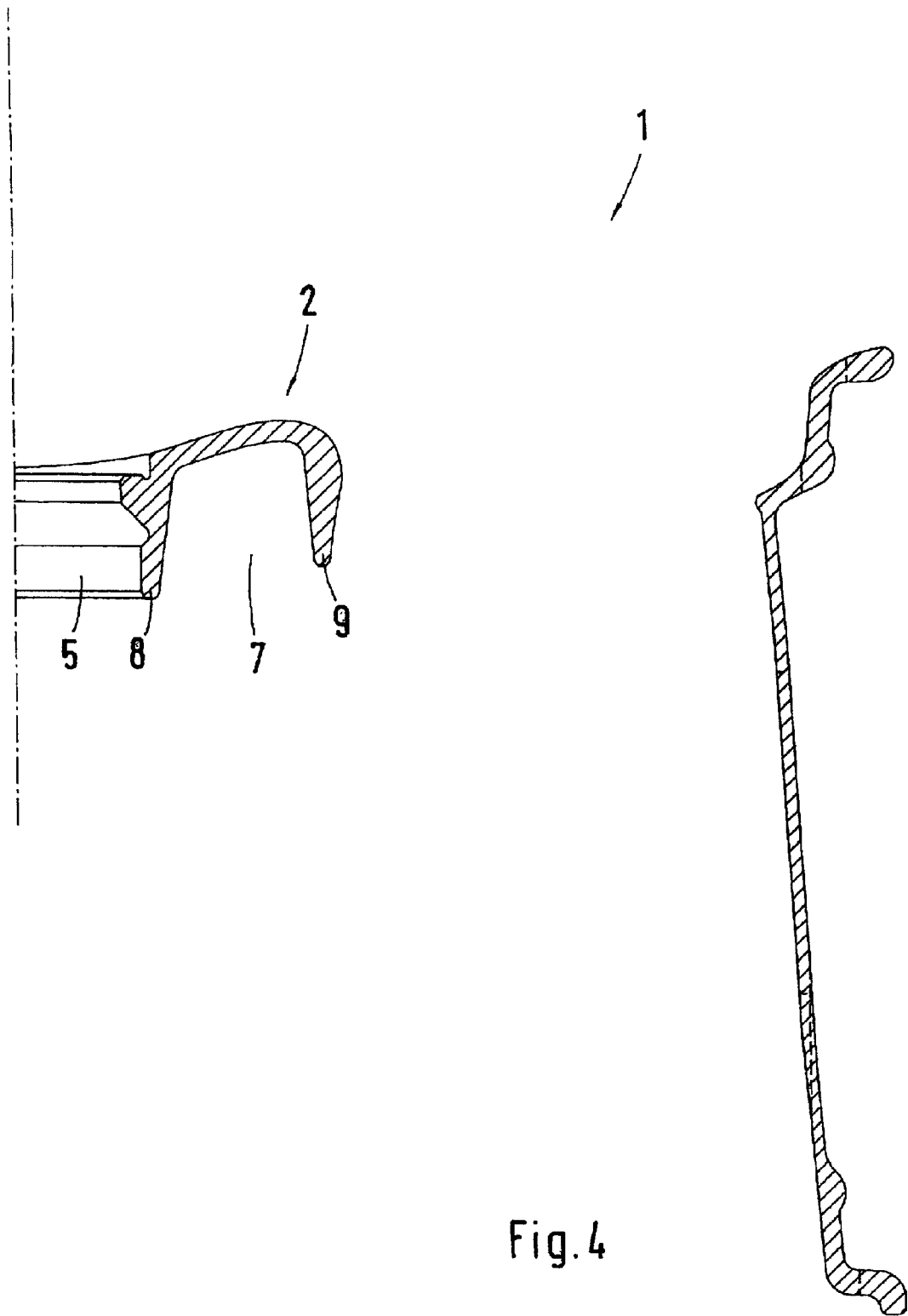
FIG. 4 is a sectional view along line IV—IV of FIG. 1.

As illustrated in FIG. 2, the wheel hub 2 is provided on the backside with indentations 7 which are arranged between the bores 6 and which open toward the backside of the wheel 1. As shown in the sectional view according to FIG. 4, one continuous, approximately cylindrical body 8, 9 is respectively formed on the inner circumference and on the outer circumference of the wheel hub 2. These bodies 8, 9 together comprise the indentations 7 as well as the openings 6 and form closed boundaries of the wheel hub 2 which extend in circumferential directions. On the backside R of the wheel 1, in the area of the openings 6, contact surfaces 10 are constructed. Each of the contact surfaces is arranged between two indentations. The contact surfaces 10 form contact surfaces between the wheel 1 and a wheel carrier which is not shown in detail.

Each spoke 4 consists of two areas 11, 12 which change into one another progressively. In the first area 11, which directly adjoins the wheel hub 2, the spoke 4 has a solid cross-section which is illustrated in detail in FIGS. 5i to 5m. In this case, the cross-section is essentially elliptical (compare FIG. 5m) in the area of the projection on the wheel hub 2 and changes over the course of the spoke 4 in the direction of the rim 3 to a triangular cross-section (compare FIG. 5i). The second area 12 closes the remaining gap to the rim 3 and is not shown in detail in FIGS. 5a to 5g. In the second area 12, a groove 13 is provided. This groove is arranged, in the center of the spoke 4, in the area of the spoke 4 facing the backside R. The groove 13, starting from the connection of the second area 12 to the first area 11, increases with respect to its depth and, directly in front of the transition to the rim 3, assumes its largest depth. The visible contour of the spoke 4 remains triangular in the course of the groove 13 so that, in the second area 12, an A-shaped cross-section (see particularly FIGS. 5d. to 5f) is initially obtained for the spoke 4, which cross-section ends in a V-shaped cross-section (FIGS. 5b to 5c). In this case, the groove 13 first has a planar base area 14 which, when a minimum wall thickness has been reached, becomes continuously narrower. The sectional view according to FIG. 5b shows the V-shaped cross-section. Here, the spoke 4 has two legs 15 and 16 which are provided with thickenings 17 and 18 on their front sides. The thickenings 17 and 18 are also visible in the sectional views according to FIGS. 5c and 5d.

Figure 5A:
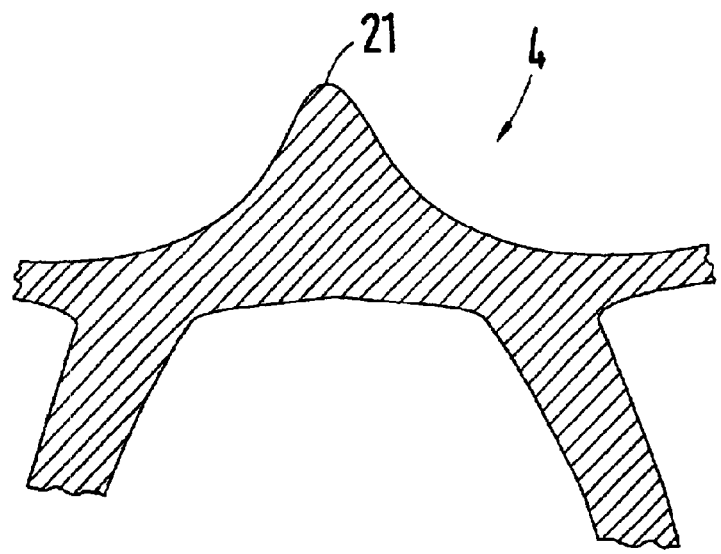
FIGS. 5a to 5p are sectional views along lines a–p, respectively, of FIG. 1.
Figure 5B:
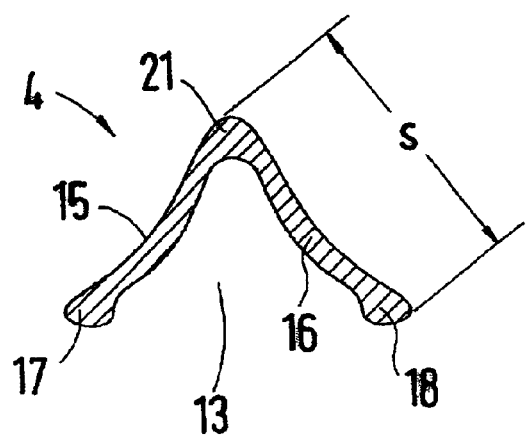
Figure 5C:
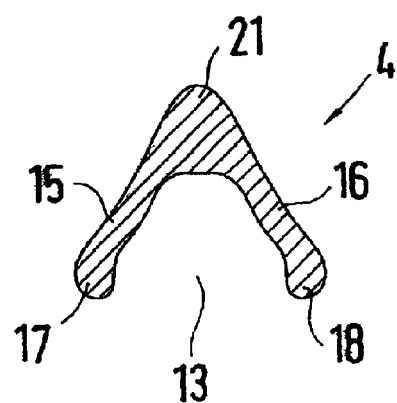
Figure 5D:
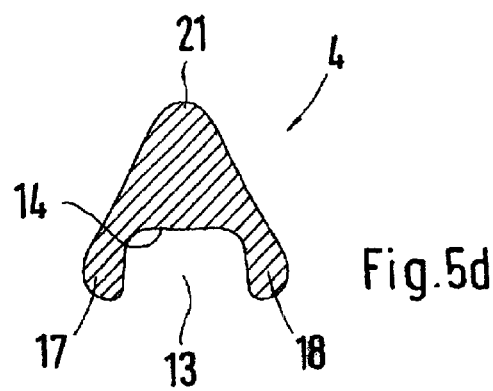
Figure 5E:
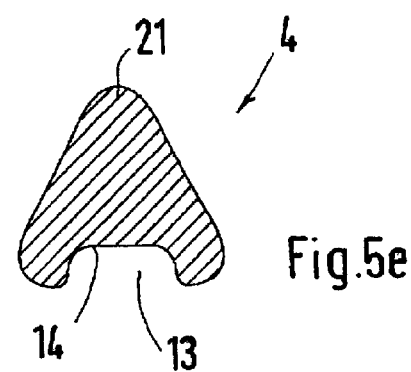
Figure 5F:
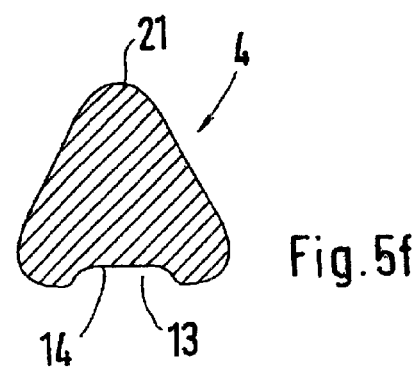
Figure 5G:
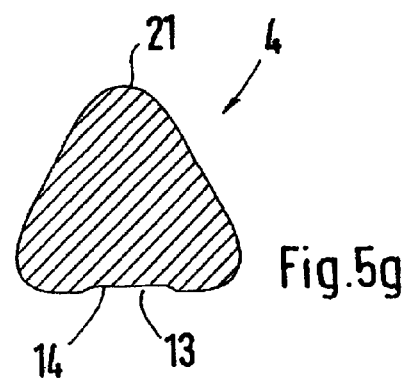
Figure 5H:
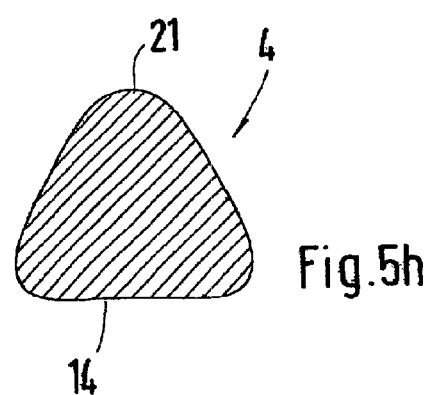
Figure 5I:
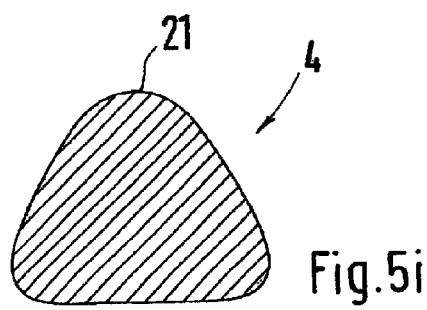
Figure 5J:
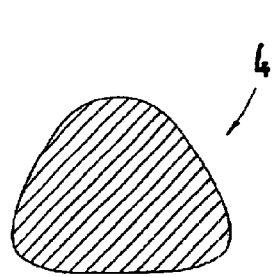
Figure 5K:
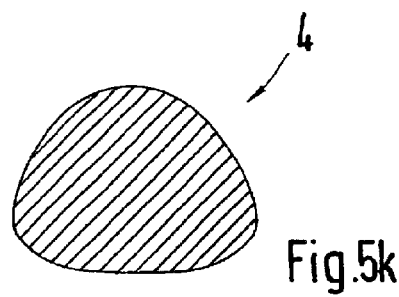
Figure 5L:
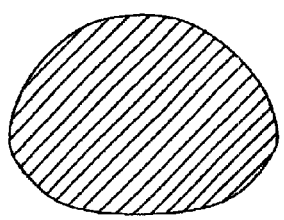
Figure 5M:
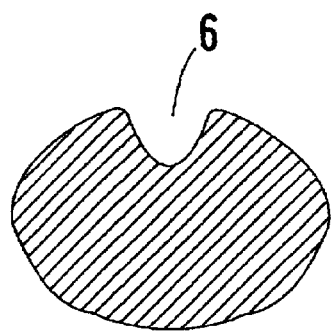
Figure 5N:
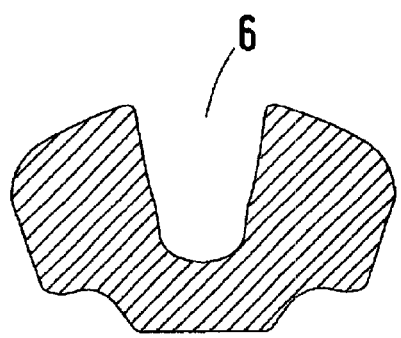
Figure 5O:
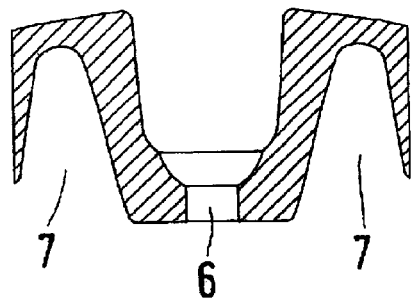
Figure 5P:
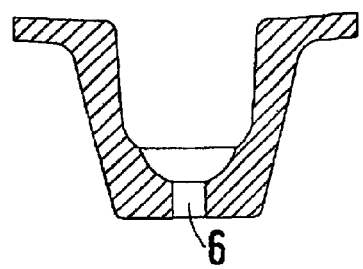
Figure 6:
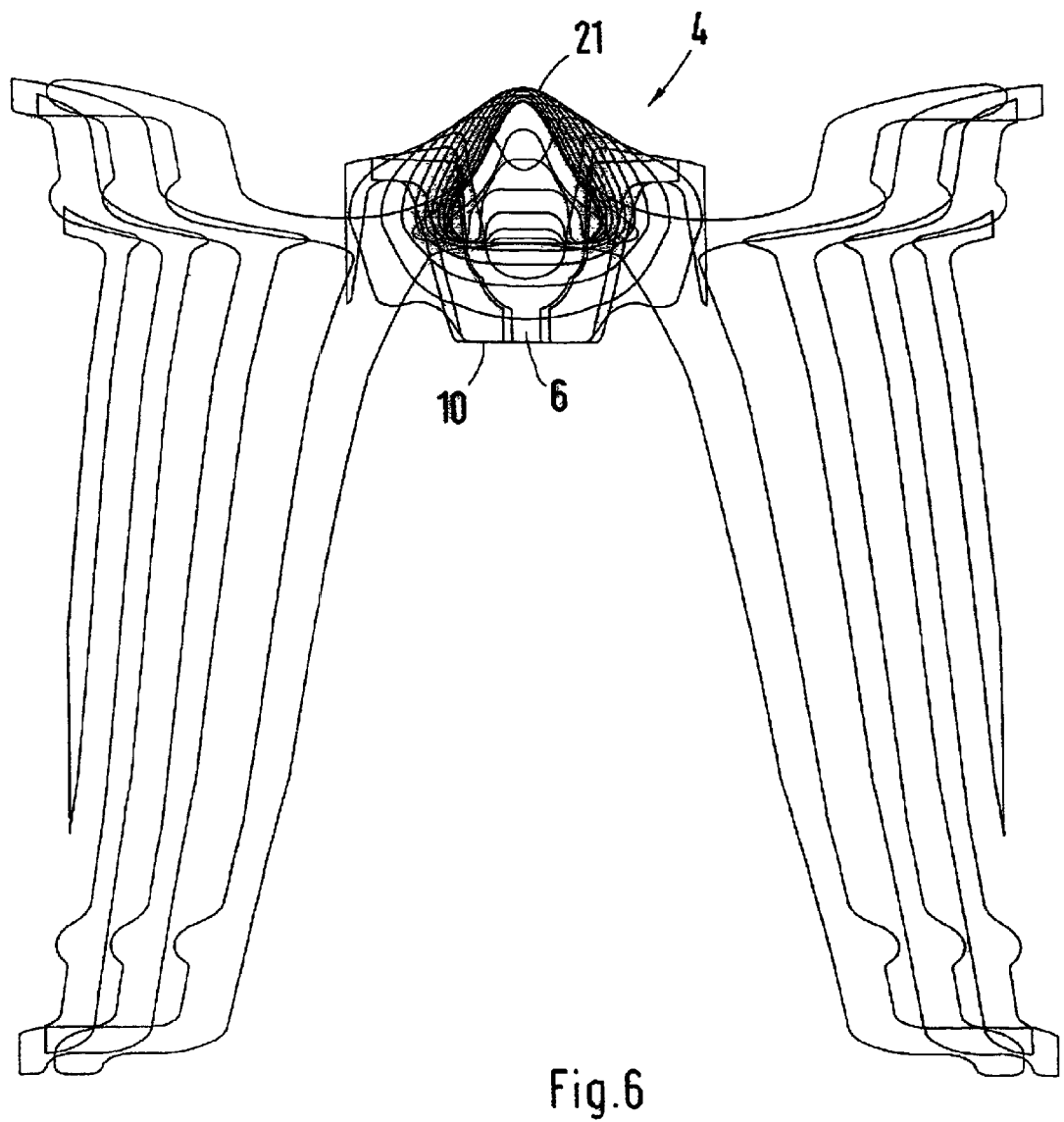
FIG. 6 is an overall view with superimposed sectional views according to FIG. 5.

FIG. 6 shows the position of the sectional views according to FIGS. 5a to 5p with respect to one another in a radial view along the axis A.

In comparison to the sectional views according to FIGS. 5c and 5b, it is also shown that, at the transition of the spoke 4 into the rim 3, the width s of the legs 15 and 16 and, simultaneously, the spreading of the legs 15 and 16 toward the thickenings 17 and 18 increase because of curvatures of the legs 15, 16. As a result, in the transition area from the spokes 4 to the rim 3, flat elements 19 and 20, which improve the introduction of peripheral forces from the spokes 4 into the rim 3, are formed.

A web 21 formed on the top side of the spoke 4 ends at an edge 22 of the rim 3.

In the illustrated arrangement of a spoke 4 together with one opening 6 respectively on the radially extending axis A, the area which, within the wheel hub 2, adjoins the first area 11 can be considered to be the third area 23 (see also the dash-dotted line in FIG. 1) of the spoke 4. The third area surrounds the opening 6 in a ring-shaped manner and adjoins the first area 11. The third areas 23 of the wheel 1 are separated from one another by the spaces 7 and are connected with one another by the cylindrical bodies 8, 9.

Figure 7:
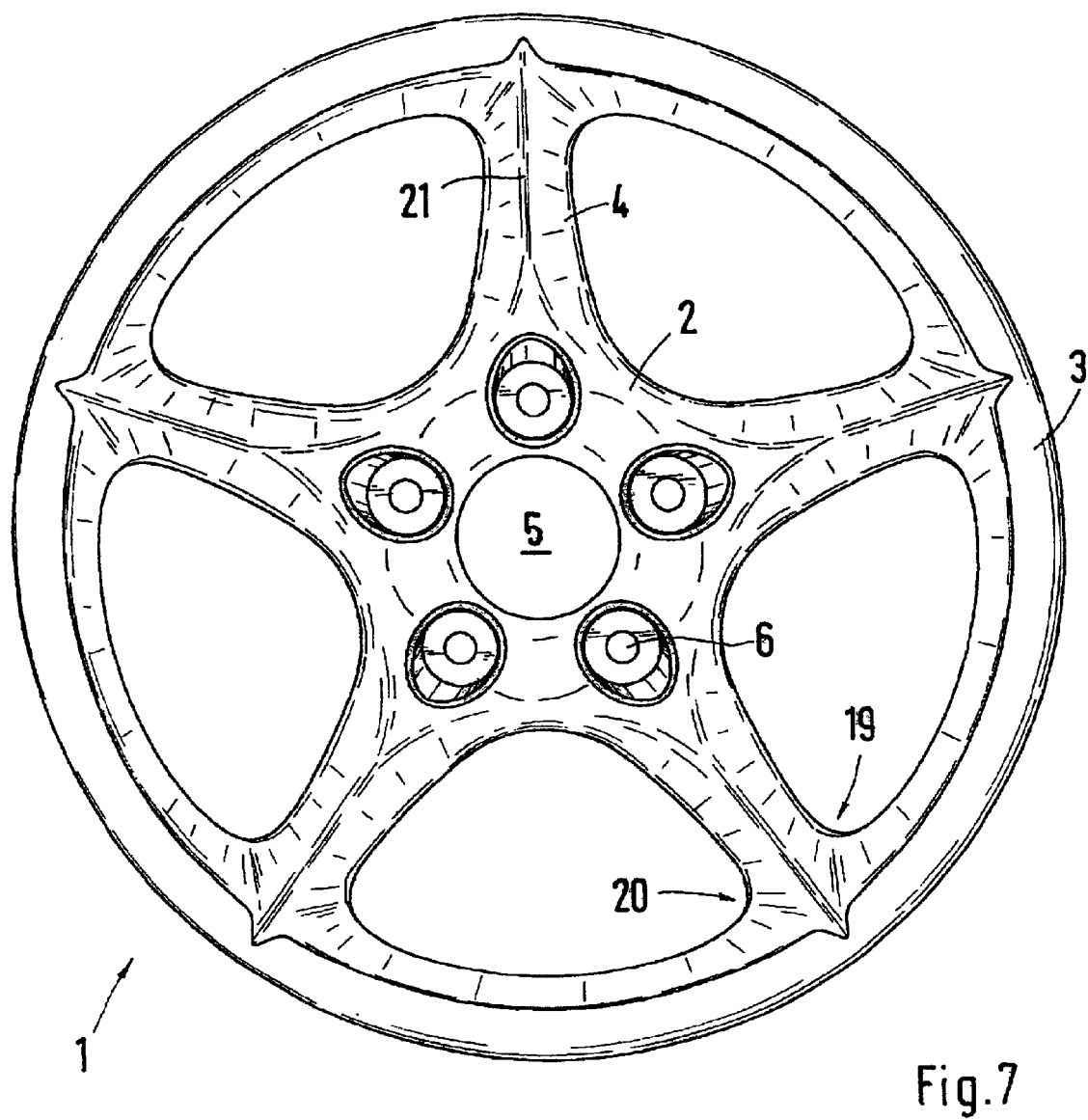
FIG. 7 is a perspective overall view of the wheel from the front.
Figure 8:
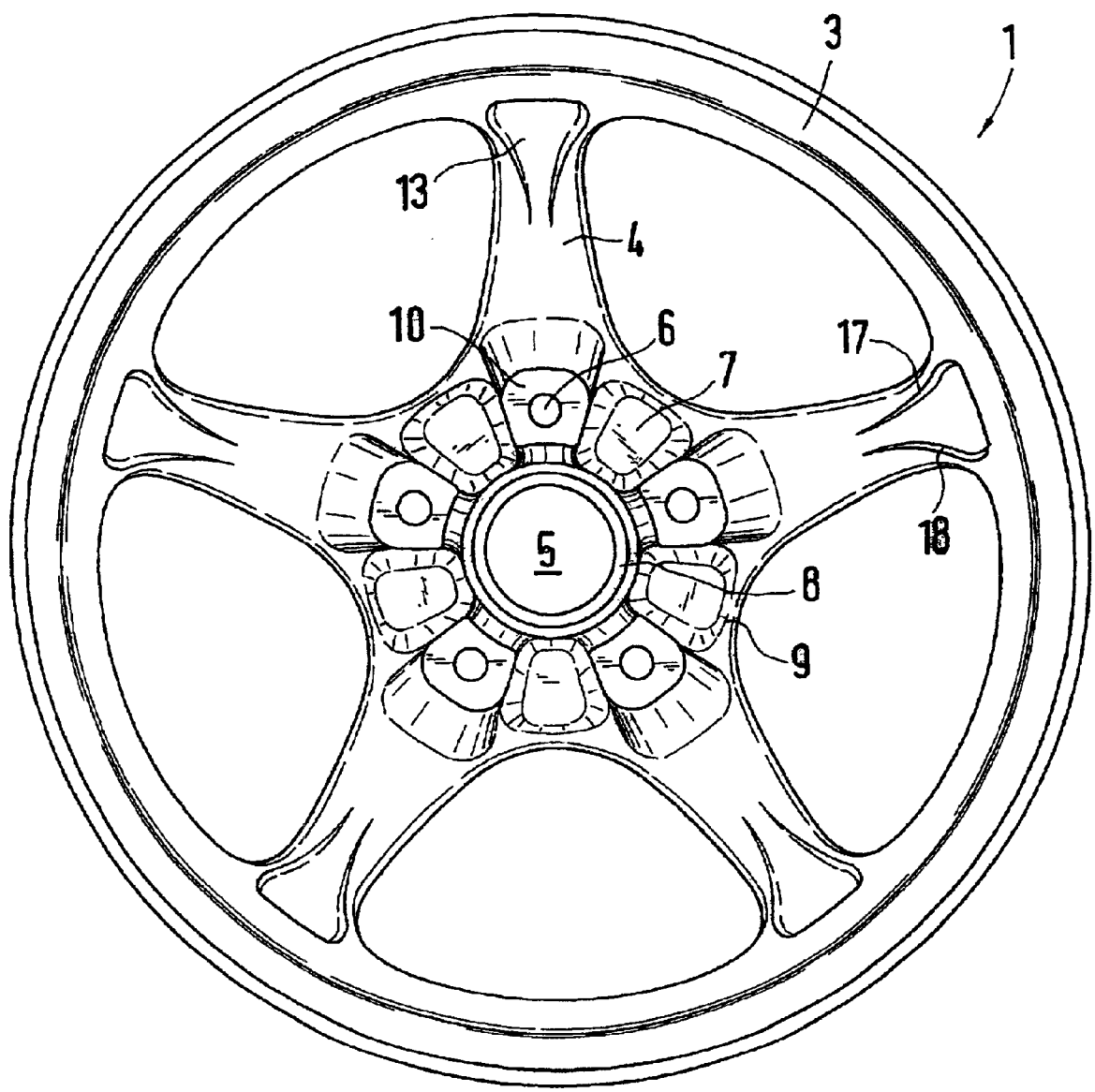
FIG. 8 is a perspective overall view of the wheel from the rear.

An overall view of the entire wheel is provided by FIGS. 7 and 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A wheel for motor vehicles comprising a wheel hub, a rim, and spokes by which the wheel hub and the rim are connected with one another, wherein, in first areas connected with the wheel hub, the spokes have solid, non-V-shaped cross-sections and, in second areas connected with the rim, the spokes have V-shaped cross-sections.

2. The wheel according to claim 1, wherein the spokes are arranged to correspond with openings for receiving fastening bolts which are provided in the wheel hub.

3. The wheel according to claim 1, wherein the wheel hub has openings for receiving fastening bolts, wherein approximately cylindrical bodies are formed on inner and outer circumferences of the wheel hub, and wherein indentations defined by the approximately cylindrical bodies are provided between the openings.

4. The wheel according to claim 1, wherein the spokes have legs, and wherein, in their second areas with the V-shaped cross-sections, the spokes have thickenings on respective free front surfaces of the legs of the spokes.

5. The wheel according to claim 1, wherein, in their second areas with the V-shaped cross-sections, the spokes have legs and the legs have widths which increase continuously toward the rim, and wherein flat elements are formed in transition areas from the spokes to the rim.

6. The wheel according to claim 2, wherein indentations are provided, and wherein approximately cylindrical bodies defining the indentations are formed on inner and outer circumferences of the wheel hub.

7. The wheel according to claim 2, wherein the spokes have legs, and wherein, in their second areas with the V-shaped cross-sections, the spokes have thickenings on respective free front surfaces of the legs of the spokes.

8. The wheel according to claim 3, wherein the spokes have legs, and wherein, in their second areas with the V-shaped cross-sections, the spokes have thickenings on respective free front surfaces of the legs of the spokes.

9. The wheel according to claim 2, wherein, in their second areas with the V-shaped cross-sections, the spokes have legs and the legs have widths which increase continuously toward the rim, and wherein flat elements are formed in transition areas from the spokes to the rim.

10. The wheel according to claim 3, wherein, in their second areas with the V-shaped cross-sections, the spokes have legs and the legs have widths which increase continuously toward the rim, and wherein flat elements are formed in transition areas from the spokes to the rim.

11. The wheel according to claim 4, wherein, in their second areas with the V-shaped cross-sections, the spokes have legs and the legs have widths which increase continuously toward the rim, and wherein flat elements are formed in transition areas from the spokes to the rim.

12. The wheel according to claim 6, wherein, in their second areas with the V-shaped cross-sections, the spokes have legs and the legs have widths which increase continuously toward the rim, and wherein flat elements are formed in transition areas from the spokes to the rim.

13. The wheel according to claim 7, wherein, in their second areas with the V-shaped cross-sections, the spokes have legs and the legs have widths which increase continuously toward the rim, and wherein flat elements are formed in transition areas from the spokes to the rim.

14. The wheel according to claim 8, wherein, in their second areas with the V-shaped cross-sections, the spokes have legs and the legs have widths which increase continuously toward the rim, and wherein flat elements are formed in transition areas from the spokes to the rim.

15. The wheel according to claim 1, wherein transitions from the first areas to the second areas are configured such that, along longitudinal courses of spokes from the wheel hub toward the rim, the cross-sections change from solid to triangular to V-shaped cross-sections.

* * * * *